United States Patent [19]

Falk

[11] Patent Number: 4,986,008
[45] Date of Patent: Jan. 22, 1991

[54] METHOD FOR DEWATERING WATER-CONTAINING PARTICLE COLLECTIONS WITH THE AID OF GAS UNDER PRESSURE

[75] Inventor: Thomas S. A. Falk, Sala, Sweden

[73] Assignee: Sala International AB, Sala, Sweden

[21] Appl. No.: 362,011

[22] Filed: Jun. 6, 1989

[30] Foreign Application Priority Data

Jun. 7, 1988 [SE] Sweden ............................. 8802110

[51] Int. Cl.$^5$ ............................................. F28B 5/04
[52] U.S. Cl. ........................................ 34/15; 34/10; 34/22; 34/51
[58] Field of Search ............ 34/10, 57 A, 57 B, 57 R, 34/15, 51, 92, 242; 210/68

[56] References Cited

U.S. PATENT DOCUMENTS

| | | | |
|---|---|---|---|
| 4,116,831 | 9/1978 | Keat | 210/68 |
| 4,644,664 | 2/1987 | Bradshaw | 34/10 |
| 4,664,813 | 5/1987 | Schneider | 210/771 |

Primary Examiner—Henry A. Bennett
Attorney, Agent, or Firm—Nils H. Ljungman & Associates

[57] ABSTRACT

The present invention relates to a method for dewatering water-containing particle collections with the aid of gas under pressure, in which at least one of a possible multiple of stages is effected with the aid of gas to which a pressure difference is imparted through and across the particle collection. A smallest predetermined pressure difference is created and the time for establishing the pressure difference does not exceed appreciably the time taken for gas penetration of the therewith dewatered particle collection to occur.

7 Claims, 1 Drawing Sheet

METHOD FOR DEWATERING WATER-CONTAINING PARTICLE COLLECTIONS WITH THE AID OF GAS UNDER PRESSURE

BACKGROUND OF THE INVENTION

1. Field of the Invention

The present invention relates to a method for dewatering water-containing particle collections in which at least one of a possible multiple of dewatering stages is effected with the aid of gas to which a pressure difference is imparted through and across the particle collection.

2. DESCRIPTION OF THE PRIOR ART

Water-containing particle collections, such as mineral suspensions and fibre suspensions, are often dewatered by first mechanically pumping the particle collection onto a filtering medium and/or by pressing said collection against said medium under high pressure, such as to form a filter cake from which water is then removed under the influence of gas under pressure. Dewatering can either be accomplished by employing a vacuum and/or by using a pressurized gas, said gas normally being compressed air. Thus, in both instances, and also in different combinations thereof, the filter cake is subjected to a pressure difference which consists, in principle, of the sum of the low pressure on the suction side and the high pressure on the pressure side. The dewatering process is effected through the influence of this pressure difference in three successive phases, mainly a first penetration phase, which is commenced by subjecting fully saturated filter cake to pressurized gas on one side thereof, and is terminated when the gas breaks through the filter cake (penetration) and thus exits from the other side of said cake. During this phase, water present in the cake is simply displaced forwardly by the advancing gas front. During the second phase, the drainage phase, the gas flows through the filter cake while maintaining a pressure difference within the cake, the water in this case being forced to move in the same direction as the gas. This phase will terminate when the water capillary forces are in equilibrium with the gas pressure prevailing locally within the filter cake, with a subsequent decrease in water flow. When this state is reached, further water can only be removed by vaporizing water into the passing gas flow. This last dewatering phase, the drying phase, is thus dependent on gas mass flow, temperature and pressure.

The aforedescribed dewatering mechanism is employed in several processes that are applied industrially for the purpose of dewatering particle collections in three phases or stages. Thus, a common feature of these processes is that dewatering is effected in at least one of the process stages with the aid of a gas to which there is imparted a pressure difference through and across the particle collection.

For instance, "Solid/Liquid Separation Technology", published by Uplands Press Ltd, 1981, describes on page 331 one such method in which gas is blown into the particle collection at a pressure of 6 bars, whereas the final stage is effected by mechanical pressing-dewatering of the particle collection.

According to another known method, described in Swedish patent application SE-8603070-7 (Sala International), the final lowering of the moisture content of the particle collection is achieved by compressed-air blowing. The above-cited publications and patent applications are incorporated herein by reference as if the texts thereof were fully set forth herein.

A common feature of all methods known hitherto, however, is that further lowering of the moisture content can only be achieved by extending the blowing time or the cake-heating time. Both cases thus require a high energy input. Furthermore, an extended blow time will lower the capacity of the filter medium used.

Because of higher energy costs and the ever greater industrial demands for more economical particle suspension dewatering processes, there is a need for further development of such dewatering processes which will render such processes less prohibitive, from the aspect of energy consumption, in the handling of these materials. In present times, energy costs are considered a very important factor in the total dewatering costs. Consequently, there is found an ever increasing desire for particle-collection dewatering processes which fulfill the requirements of lower energy consumption and/or higher productivity.

OBJECT OF THE INVENTION

It has now surprisingly been found possible to provide a method which will enable energy consumption to be kept low and higher productivity to be achieved in a simple fashion. The inventive method will be apparent from its characterizing features set forth in the following method claims.

SUMMARY OF THE INVENTION

Thus, the novel and inventive method is based on the principle of effecting pressurized-gas dewatering of the particle collection or agglomeration in essentially one single stage, namely the penetration stage, instead of in all three stages of the conventional method described briefly above. It has been found, very surprisingly, that dewatering in one single stage can be effected in a manner such as to render further dewatering stages unnecessary, therewith utilizing the energy input to an optimum. According to the invention, dewatering is accomplished with a high gas pressure or large pressure difference of not less than 1 atm over a well defined time period, namely the time taken for the gas to penetrate, i.e. pass through, the particle collection (the filter cake). During the development of the present invention, it was found possible to achieve the same residual moisture content in the particle collection with a net energy input of only one hundredth, or even less, of that required when employing conventional gas-pressure dewatering processes. At the same time, the invention resulted in higher productivity for given dewatering apparatus, since the time taken to dewater the particle collection to the aforesaid same moisture level also fell drastically.

The time taken for the gas to penetrate a particle collection is a highly complex magnitude which is contingent, inter alia, on the thickness or depth extension of the particle collection (the filter cake), the pressure applied, the porosity of the filter cake, the specific surface area and density of the particles, the viscosity of the water and the proportion of solids in the particle collection.

The higher the pressure difference, the shorter the time taken to penetrate the particle collection and, paradoxically, the greater the savings in energy that can be achieved. For instance, it was found that when dewatering a given mineral concentrate, the penetration times were ca 120 s at 2 atm pressure, ca 50 s at 4 atm, ca 30 s at 6 atm, ca 15 s at 10 atm and only ca 10 s at 20 atm pressure. Corresponding residual moisture contents were, in percent by weight, ca 10 at 2 atm, ca 9 at 4 atm, ca 7 at 6 atm, ca 6.5 at 8 atm, ca 6 at 10 atm and ca 5 at 20 atm.

According to one preferred embodiment of the invention, the pressure difference is engendered by first compressing a given, known gas volume to a pressure which will provide the predetermined pressure difference through and across the particle collection, while taking into account possible pressure losses and an optionally applied sub-ambient pressure on the suction side, whereafter the compressed gas is allowed to act freely on the particle collection. The simplest method of achieving this in practice is by pumping gas, from a small compressor, into a pressure vessel until the desired pressure is obtained, and then opening a valve so as to allow the gas to exit forcibly onto the particle collection for as long as it takes the gas volume to expand. Having knowledge of the volume of the pressure vessel, it is possible to calculate the pressure, or vice versa if so desired, so that the time taken for the gas to exit from the pressure vessel will correspond essentially to the penetration time, when this is known or can be calculated in respect of the material and dewatering apparatus concerned. In accordance with another preferred embodiment, which does not assume that the penetration time is known, a gas flow of constant predetermined pressure, for instance taken from a compressed air mains, is allowed to act on the particle collection until penetration occurs. The time at which penetration occurs can be followed-up and indicated in several ways, although it is preferred to measure the flow of gas through the particle collection continuously, and to cut-off the gas flow automatically when penetration is indicated. Naturally, these two embodiments of the inventive method can be combined in different ways.

BRIEF DESCRIPTION OF THE DRAWINGS

The invention will now be described in more detail with reference to a preferred embodiment and also with reference to the accompanying drawing, in which.

DESCRIPTION OF THE PREFERRED EMBODIMENT

Figure 1:
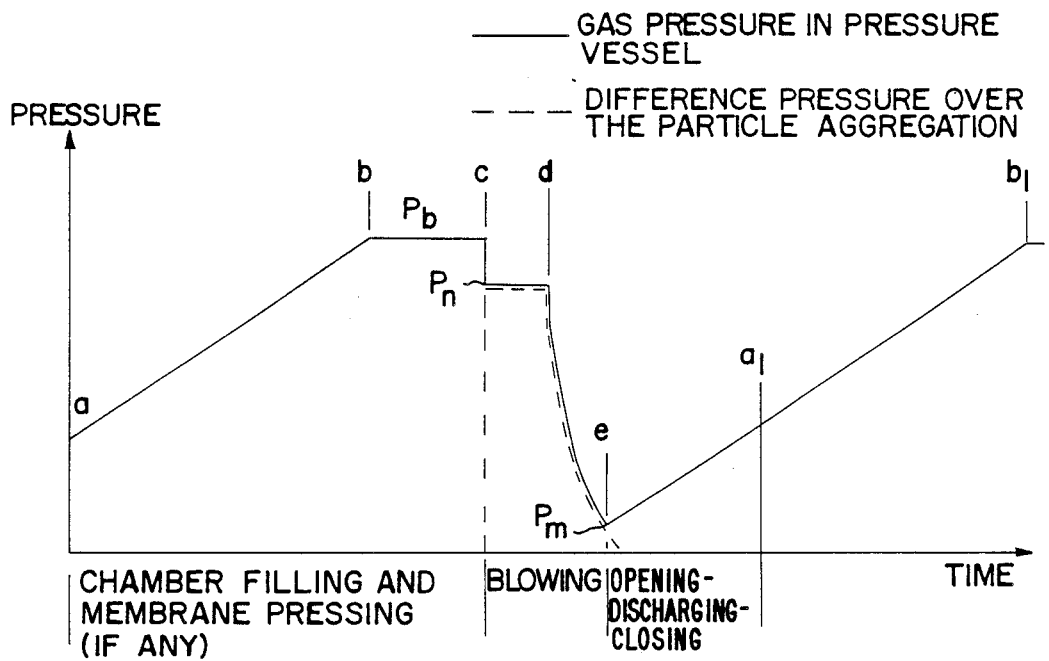
FIG. 1 is a principle diagram of the gas pressure prevailing in the pressure vessel through and across the particle collection, as a function of the state of a working cycle.
Figure 2:
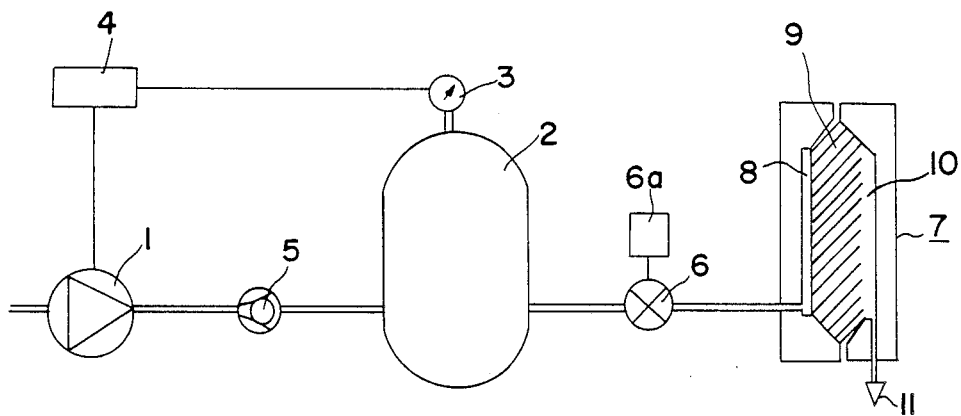
FIG. 2 illustrates the principle construction of apparatus for carrying out the preferred embodiment.

Referring to FIG. 2, gas, normally air, is supplied to a pressure vessel 2 from a compressor 1. The capacity of the compressor 1 is preferably chosen so that a desired maximum pressure $P_b$ is obtained in the pressure vessel 2 prior to the blowing phase of the working cycle, time point c in FIG. 1. In this way, minor variations in the duration of the working cycle will not affect the maximum pressure $P_b$, and therewith the end result. Consequently, the compressor 1 is relieved of load at point b (FIG. 1) at which the pressure $P_b$ has been reached, e.g. through a compressor control circuit 4 which is activated by a control signal produced by a manometer 3, back leakage of gas through the pressure-relieved compressor 1 being prevented by a check valve 5. The volume of the pressure vessel 2 is selected so that the useable part of the enclosed compressed gas at pressure $P_b$ has an energy content which corresponds to the energy required to expel liquid. When the working cycle reaches time c, a valve 6 is opened by an auxiliary operating device 6a, such that gas will flow into the high pressure side 8 of a chamber arrangement 7 of the kind described and illustrated in the aforementioned publication SE-8603070-7. The gas pressure will fall from pressure $P_b$ to pressurer $P_n$, as a result of the increase in the available gas volume, said gas pressure $P_n$ being chosen so that the requisite expulsion of liquid will have been achieved upon completion of the penetration of the gas and associated lowering of the pressure, time point e. The gas on the high pressure side 8 can only expand further, while displacing liquid from the initially liquid-saturated particle collection 9. The displaced liquid exits into the low pressure side 10 of the chamber 7, and is led away from said low pressure side through a drainage pipe 11. The gas reaches the low pressure side 10 at time point d, wherewith the rate of flow of the gas increases drastically while displacing flow-prohibiting liquid from the major part of the pore system in the particle collection 9. The gas pressure will now fall quickly across the particle collection 9 and the through flowing gas will assist in draining liquid from the particle collection 9 and the chamber 7. The valve 6 is closed at time point e (alternatively at pressure $P_m$) and the compressor 1 is switched to its working state, so that the gas pressure will again rise to pressure $P_b$ during the time points e-$b_i$. During this time period, the chamber 7 has been opened and its contents discharged and optional washing of the filter medium on fabric cloth has been carried out, the chamber 7 has been reclosed and again filled, accompanied by optional subsequent pressing of the particle collection through a membrane.

The following advantages are among those which can be achieved when practicing the preferred embodiment of the invention:

(1) The time required to complete the gas blowing stage is shorter than the time required when practicing the known technique. For example, a 32 mm cake of a given hematite having a $k_{80}$ value of 40 microns requires a blowing time of ca 33 s in order to achieve a 6% residual moisture content at a pressure difference of 6 atm. When proceeding in accordance with the preferred embodiment, a corresponding residual moisture content is achieved after a total blowing time of ca 30 s, when the pressure $P_n$ is set to a 10 atm overpressure. In practice, this increases the capacity of given apparatus by about 100%. Naturally, this will lower considerably the investment costs of the press equipment.

(2) The net energy input required to expel liquid to the desired level is lowered by more effective use of the gas medium employed. In the aforedescribed example, the net energy consumption falls from about 290 kJ/kg expelled water to about 50 kJ/kg water. This results in appreciable lowering of operational costs.

(3) The compressor requirement is reduced due to the reduction in energy requirements. When applying the known technique with the aforesaid example, there was required a compressor capable of delivering ca 15 Nm$^3$/m$^2$ filter area at 6 atm above ambient pressure over a period of 5.5 min, whereas the preferred inventive embodiment required a compressor capable of compressing ca 2 Nm$^3$/m$^2$ to 10 atm above ambient pressure over a running time of ca 5 min. This lowers the capital costs for peripheral equipment.

The invention as described hereinabove in the context of a preferred embodiment is not to be taken as limited to all of the provided details thereof, since modifications and variations thereof may be made without departing from the spirit and scope of the invention.

What is claimed is:

1. A method for dewatering a water-containing particle collection by pressurized gas which includes a dewatering stage in which said pressurized gas imparts a pressure difference through and across the particle collection, wherein said pressure difference is a predetermined pressure difference of about at least 1 atmosphere which is maintained over a time period which only slightly exceeds the amount of time which is required for the gas to penetrate the particle collection.

2. A method according to claim 1, further including controlling the predetermined pressure difference and said time period, by first compressing a predetermined gas volume to a predetermined pressure which stands in relation to said pressure difference, and then permitting the compressed gas volume to act on the particle collection.

3. A method according to claim 1, wherein said predetermined pressure difference is created by permitting a gas flow of constant predetermined pressure in relation to said pressure difference to act upon the particle collection, until said penetration occurs.

4. A method according to claim 2, further including compressing said gas with the aid of a compressor which is operative in supplying gas to a pressure vessel of predetermined volume until said predetermined pressure is reached.

5. A method according to claim 1, wherein said amount of time which is required for the gas to penetrate the particle collection is determined by continuously monitoring the gas flow.

6. A method according to claim 1, further including the step of stopping the gas flow when the gas penetrates the particle collection.

7. A method for dewatering a water-containing particle collection having a dimension in at least a first direction comprising the steps of:
   providing compressed gas means for supplying a gas under a predetermined pressure which is above generally ambient air pressure;
   providing support means for supporting the particle collection;
   providing gas discharge means for being fluidly connected to said compressed gas means and for being fluidly connected to said support means for receiving said gas under pressure from said compressed gas means and for discharging said gas under pressure and causing penetration of said gas under pressure through said dimension of said particle collection in said at least said first direction;
   supporting the particle collection with said support means;
   receiving said gas under pressure by said gas discharge means from said compressed gas means;
   discharging said gas under pressure for a predetermined period of time through said dimension of said particle collection in said at least said first direction, whereby the water-containing particle collection will be at least partially dewatered;
   wherein said predetermined pressure is at least one atmosphere; and
   wherein said predetermined period of time approximately equals the amount of time which is required for said gas under pressure to penetrate said dimension of said particle collection.

* * * * *